United States Patent [19]

Dupuy

[11] Patent Number: 5,001,867
[45] Date of Patent: Mar. 26, 1991

[54] DOOR GLASS CASSETTE FOR VEHICLES

[75] Inventor: Ronald E. Dupuy, Wabash, Ind.

[73] Assignee: GenCorp Inc., Fairlawn, Ohio

[21] Appl. No.: 412,978

[22] Filed: Sep. 26, 1989

[51] Int. Cl.$^5$ ................................................ B60J 5/04
[52] U.S. Cl. .................................... 49/502; 49/352;
49/377; 49/441; 49/490
[58] Field of Search ............... 49/502, 380, 352, 349,
49/374, 375, 377, 378, 441

[56] References Cited

U.S. PATENT DOCUMENTS

| | | | |
|---|---|---|---|
| 2,658,790 | 11/1953 | Fish et al. | 49/378 X |
| 2,749,911 | 6/1956 | Griffin . | |
| 2,844,405 | 7/1958 | Roethel | 49/377 X |
| 3,370,384 | 2/1968 | Hafer et al. | 49/502 |
| 4,001,971 | 1/1977 | Gobush et al. | 49/352 |
| 4,110,935 | 9/1978 | Sessa | 49/352 |
| 4,306,378 | 12/1981 | Fukura et al. | 49/352 |
| 4,396,221 | 8/1983 | Morgan et al. | 49/490 X |
| 4,470,223 | 9/1984 | Mesnel | 49/441 |
| 4,593,494 | 6/1986 | Ono et al. | 49/502 X |
| 4,635,947 | 1/1987 | Hatayama | 49/377 X |
| 4,662,115 | 5/1987 | Ohya et al. | 49/502 |
| 4,671,013 | 6/1987 | Friese et al. | 49/380 |
| 4,785,585 | 11/1988 | Grier et al. | 49/502 |
| 4,793,099 | 12/1988 | Friese et al. | 49/352 X |

FOREIGN PATENT DOCUMENTS

| | | | |
|---|---|---|---|
| 571753 | 12/1988 | Belgium . | |
| 491917 | 4/1953 | Canada | 49/352 |
| 213247 | 11/1988 | Fed. Rep. of Germany . | |

*Primary Examiner*—Philip C. Kannan

[57] ABSTRACT

The present invention relates to an automobile door glass cassette containing a frame and seal assembly and a glass regulator means which is pre-assembled and fitted into an automobile door. The seal assembly is a peripheral elastomeric gasket secured to the outer periphery of the cassette frame structure and is readily fitted into an automotive door structure and assures a tight sealing fit.

38 Claims, 6 Drawing Sheets

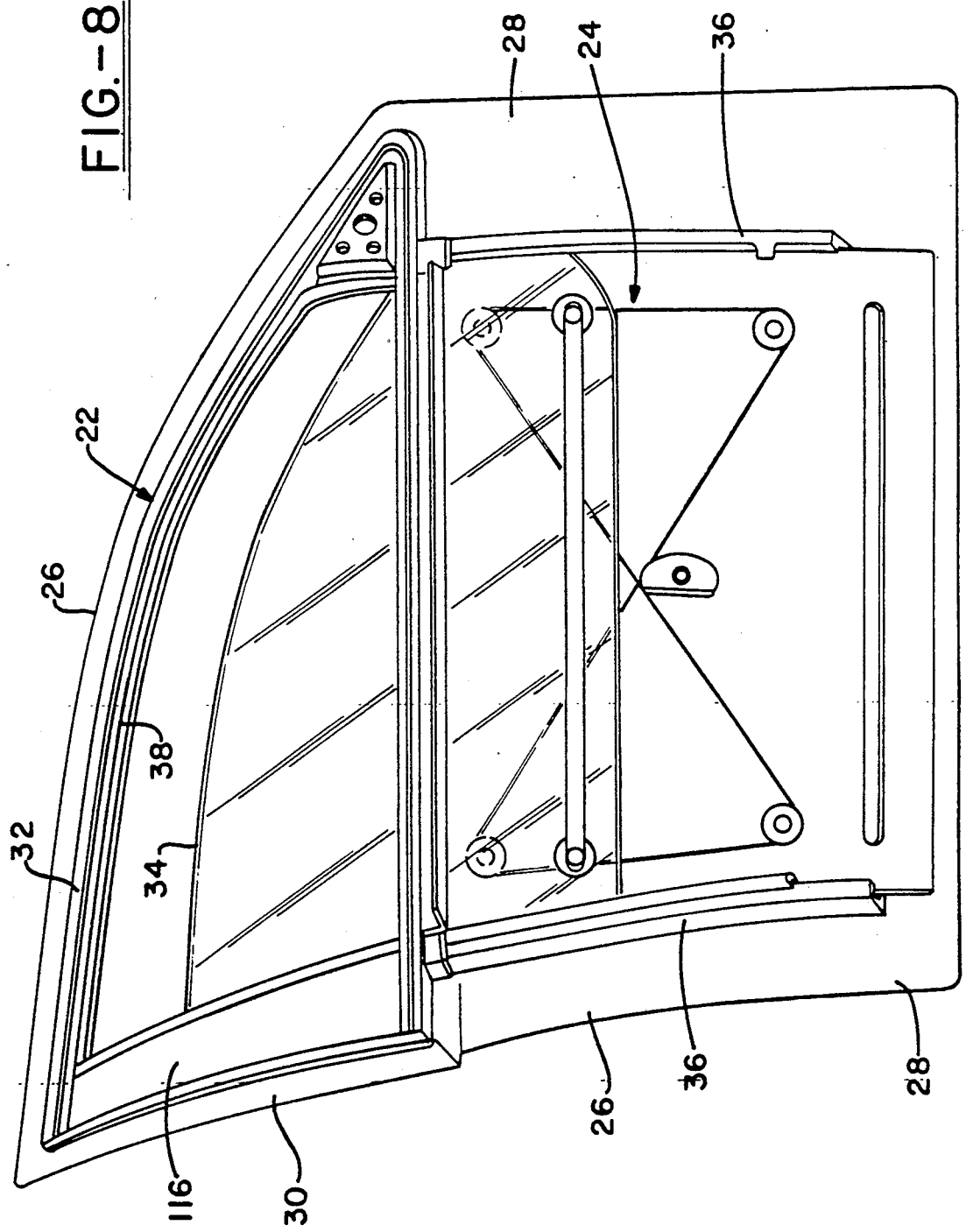

5,001,867

DOOR GLASS CASSETTE FOR VEHICLES

FIELD OF THE INVENTION

The present invention relates to a door glass cassette for motor vehicles which is expediently fitted within a vehicular door structure as on an assembly line.

BACKGROUND OF THE INVENTION

Heretofore, automobile door frames and understructures therefor were assembled on the assembly line piecemeal by individually attaching to the door the understructure, the window lifting mechanism, and a plurality of individual window seals. Thereafter, the window regulator or crank mechanism was opertively connected to the lifting mechanism. The procedure was cumbersome and time consuming, especially the installing of the individual seals to the window frames in a piecemeal manner. Quite often gaps between the individual window seals existed which resulted in undesirable water leaks, noises, and the like.

U.S. Pat. No. 4,785,585 discloses an integral hardware module including window glass, window tracks and a regulator mechanism, where the module is secured inside the door below the window opening.

Similarly, U.S. Pat. No. 4,793,099 discloses a tape driven power window module for raising and lowering a vehicular window while U.S. Pat. No. 4,110,935 suggests a take-up mechanism in a cable actuated window lifting device for automobile side windows.

Patentschrift No. 213247 issued Jan. 25, 1961 and Belgian Patent No. 571753 issued Oct. 31, 1958 both disclose a cable actuated system for raising and lowering automobile windows.

SUMMARY OF THE INVENTION

The present invention relates to an automobile door glass cassette having a frame and seal assembly for a glass window and a glass regulator assembly secured together as a unit and adapted to be quickly inserted into an automotive door frame on an assembly line. The frame and seal assembly comprises vertical side and top window or glass channels and a lateral guide means located between the side channels. All of the channels are fitted with interior and exterior seals secured adjacent to the glass opening. The door glass cassette assembly further contains a glass regulator assembly secured between the lower part of side channels below the belt line and is operative to raise and lower the glass within the frame and seal assembly. The outer perimeter of the frame and seal assembly is encapsulated with elastomeric material to provide a resilient peripheral gasket to facilitate easy assembly within the door frame and further provide a tight compressive fit within the door structure.

BRIEF DESCRIPTION OF THE DRAWINGS

FIG. 8 is a front elevation assembly view of the door glass cassette including the glass regulator assembly shown in FIG. 1 installed in a door frame.

DETAILED DESCRIPTION OF THE INVENTION

Figure 1:
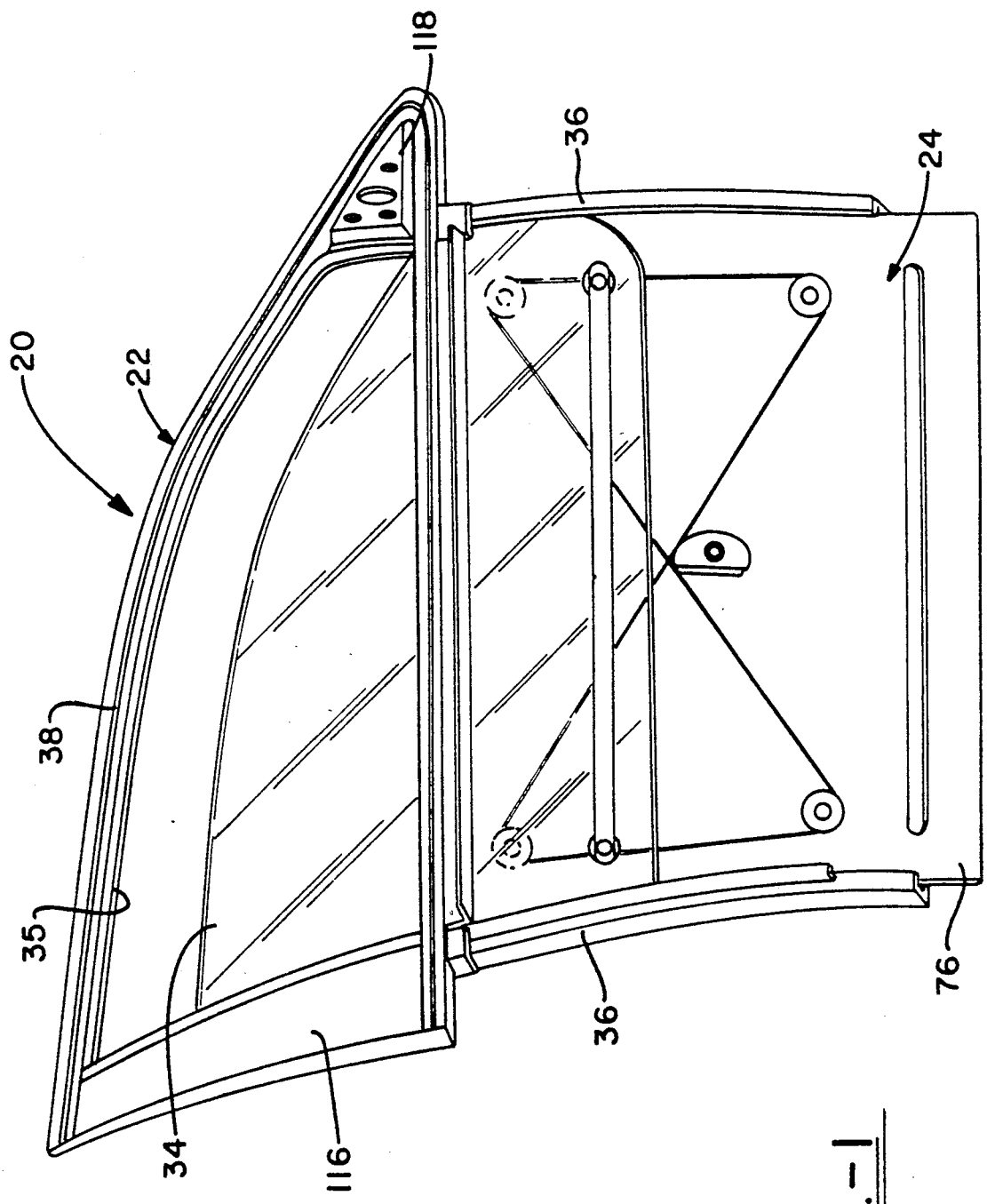
FIG. 1 is a front elevation view of the automobile door glass cassette of the present invention comprising a frame and seal assembly and a glass regulator assembly.
Figure 2:
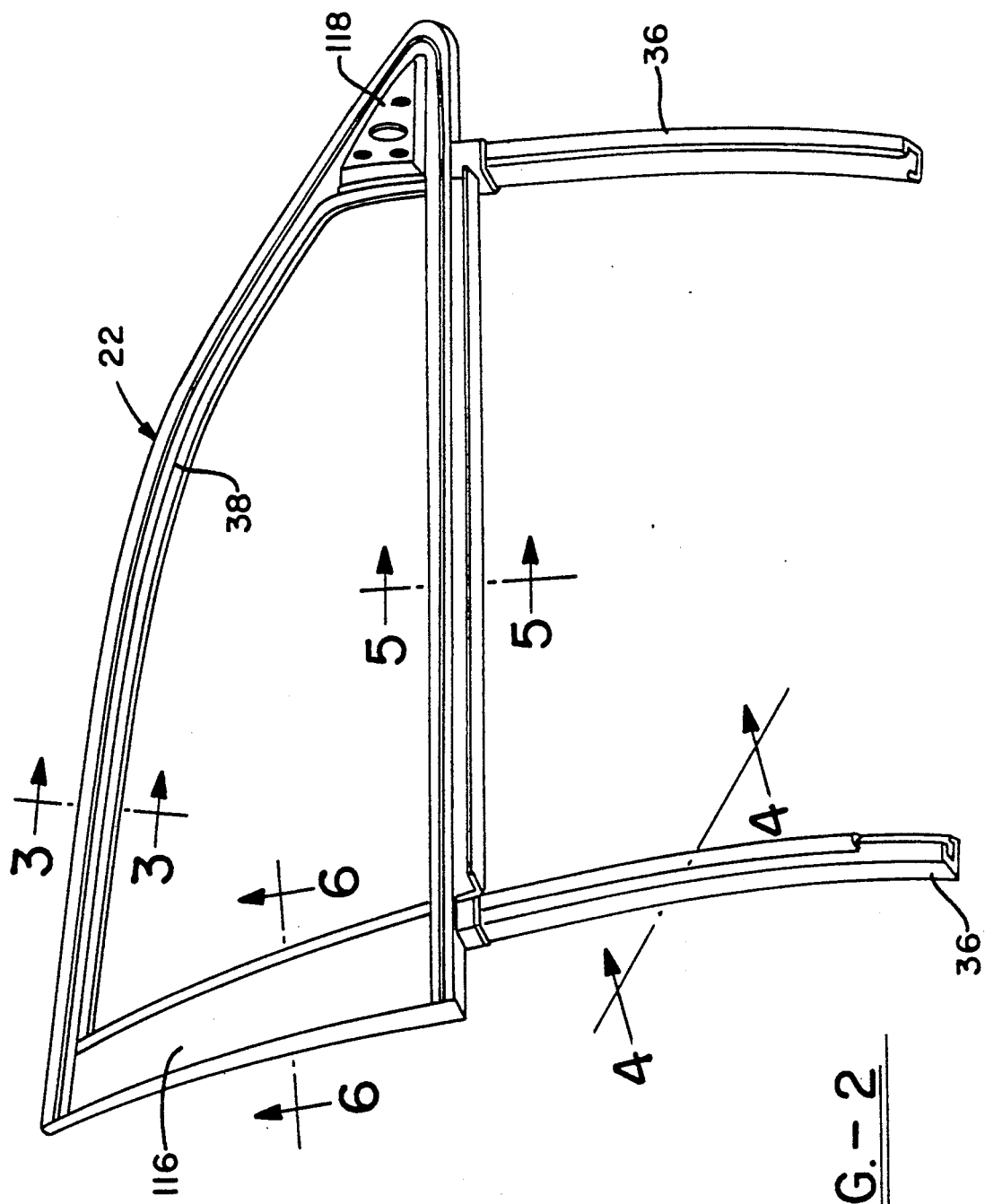
FIG. 2 is the structure shown in FIG. 1 with the glass regulator assembly removed.
Figure 7:
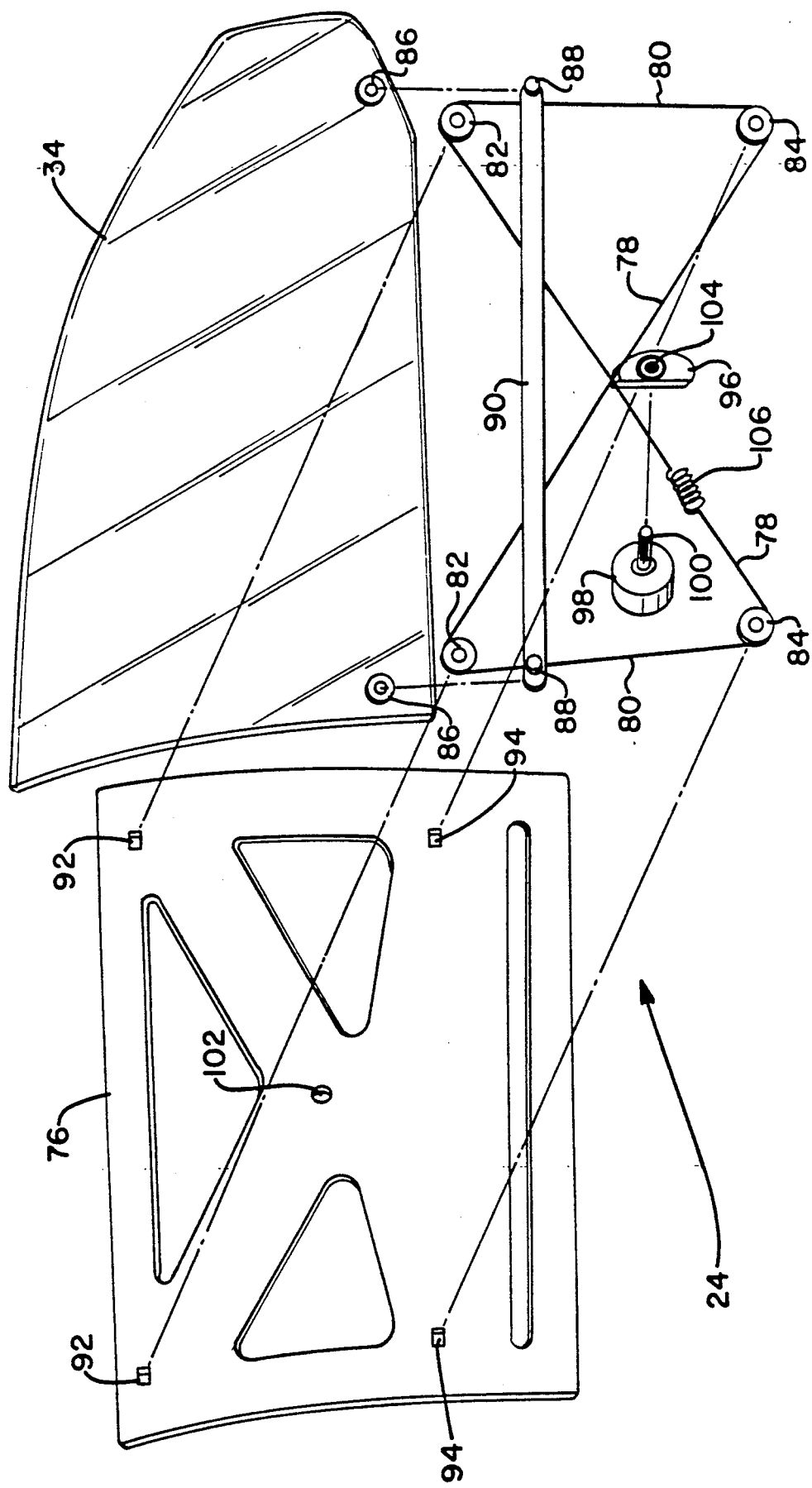
FIG. 7 is a front elevation assembly view of the glass regulator assembly shown in FIG. 1.

Referring now to the drawings wherein like reference characters indicate like parts, an automobile door glass cassette generally indicated by the numeral 20 comprises a frame and seal assembly 22 generally in the form of a perimeter around a window opening and a glass regulator assembly 24 is shown in FIGS. 1, 2 and 7. The door glass cassette 20 is adapted to be pre-assembled as a unit and readily fitted into place within the automobile door frame 26 comprising a door panel 28, a center post or B pillar 30, and a curved overhead molding or header 32, which collectively define a window or glass opening in the door structure, as shown in FIG. 8.

Figure 5:
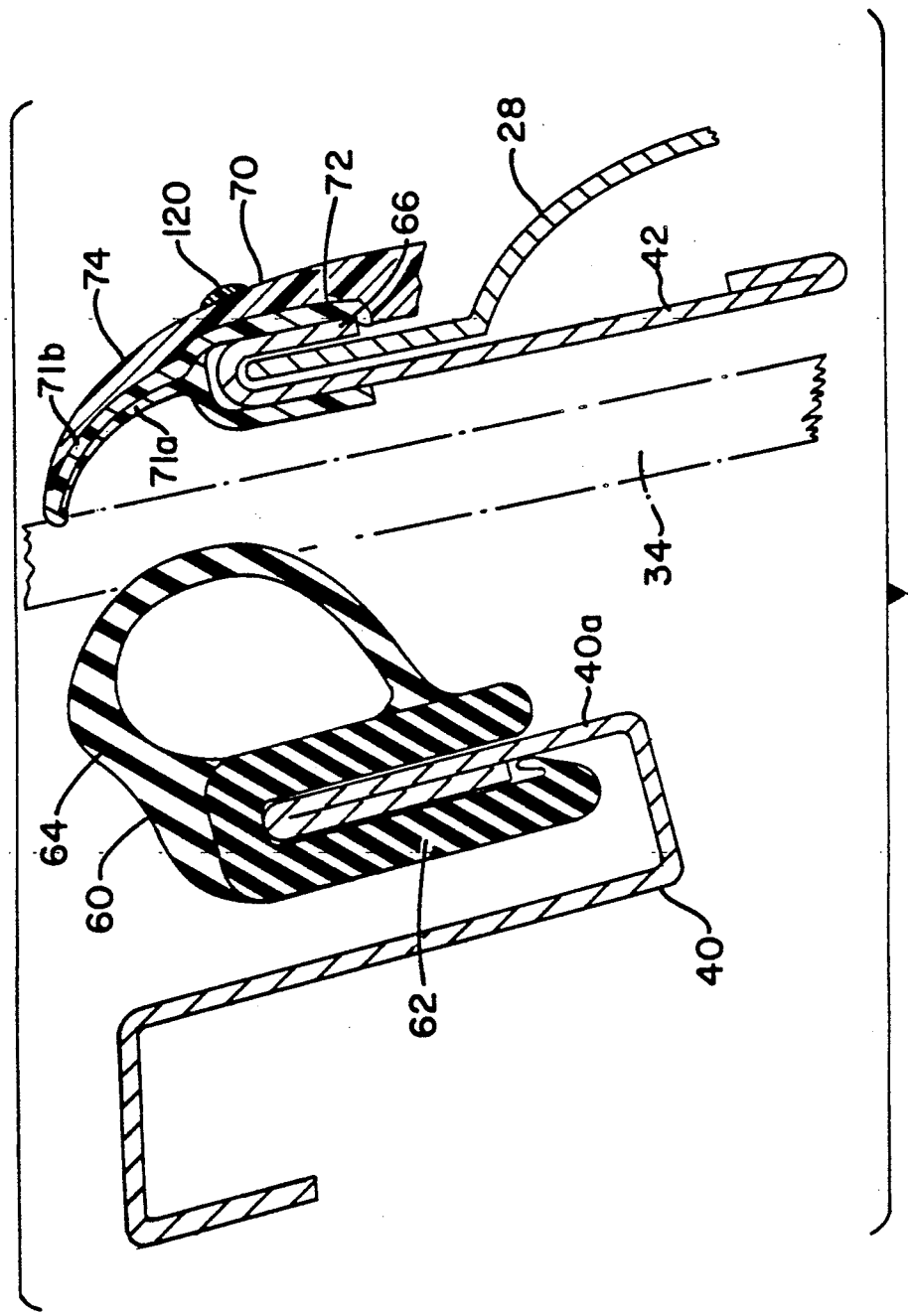
FIG. 5 is a sectional view taken along 5—5 in FIG. 2.

FIG. 1 is the door glass cassette 20 of the present invention comprising the frame and seal assembly 22 with the glass regulator assembly 24 fitted within the door glass cassette and showing a window or glass pane 34 partially raised within the glass opening. By the term "glass" pane, it is meant to include other material used or useful in windows such as various plastics, usually transparent, and the like. The frame and seal assembly 22 is separate from the regulator assembly 24 and generally comprises a continuous U-shape channel and desirably constitutes a continuous perimeter frame 35. The perimeter channel frame comprises a pair of laterally spaced vertical side channels 36, and a top channel 38 to provide structural framework in which the window pane is operatively raised or lowered. Each side channel 36 has the open U-shape structure directed inwardly toward the glass opening while the top channel 38 has the open U-shape inverted and directed downwardly toward the glass opening. The lower dimension or belt line of the glass opening in the frame and seal assembly 22 is defined by a lateral guide opening means adapted to permit the glass pane 34 to pass freely between an inside lateral Z-member 40 and an outside lateral I-member 42 having a short vertical height which together define a narrow transverse opening laterally disposed between the Z-member 40 and I-member 42 as shown in FIG. 5. The members are generally made of metal such as steel but can be molded polymeric matrix composites such as fiber reinforced composites containing glass fibers, metal fibers, carbon fibers or polymeric fibers such as nylon or polyester and a binder matrix resin such as epoxy resin. Side U-channels 36, the top inverted U-channel 38 and the lateral guide members 40,42 collectively define the glass opening and each contain cooperative sealing elements of polymeric material adapted to seal the glass pane 34 on the inside and outside thereof when the glass pane is fully closed and to guide the glass pane with regard to its front leading edge and rear trailing edge as it is raised or lowered within the glass opening in the door glass cassette 20.

Figure 4:
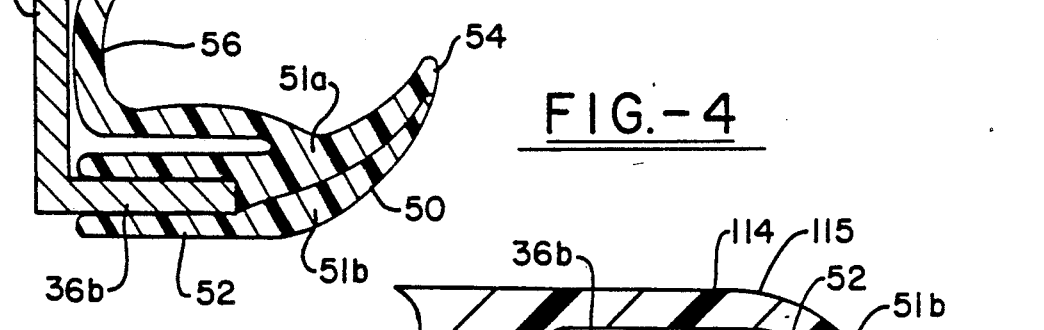
FIG. 4 is a sectional view taken along line 4—4 in FIG. 2.
Figure 6:
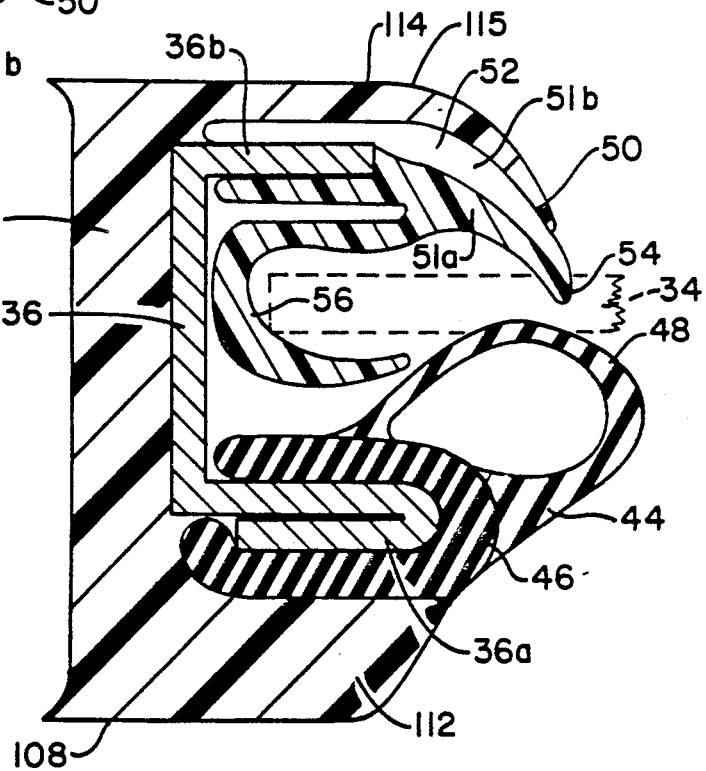
FIG. 6 is a sectional view taken along line 6—6 in FIG. 2.

Referring to the U-shape side channels 36, as seen in FIG. 6, each channel 36 has an inside extension 36a and an outside extension 36b on which the sealing elements are secured in a cooperative mode to engage the glass pane 34. An interior seal 44 is secured to the inside extension 36a and comprises a solid, generally rigid member 46 having a recess slot securely engaging the extension 36a and a flexible hollow extension member 48 in the shape of a hollow-bulb secured to the solid member 46 and protruding outwardly toward the glass pane 34 where the flexible hollow bulb-like seal member 48 is adapted to engage and seal against the inside of the pane. The hollow bulb-like member 48, which may be solid or porous (e.g. sponge-like), is sufficiently resilient to hold its general protruding bulbous shape and yet is sufficiently flexible to slightly collapse internally while tightly and slidably engaging the glass pane 34. As shown in FIG. 4, the interior seal is generally not included below the window belt line or the lateral guide means comprising Z-member 40 and I-member 42. That is, the lower portion of channels 36a, 36b only require a glass run channel 56 in conjunction with an exterior seal 50 having a base member which encases outside channel extension 36b. Inside seal 44 is generally made from an elastomer such as EPDM of dual durometer where rigid member 46 has a high durometer hardness such as from about 80 to about 90 whereas the bulb-like protruding member 48 has a low durometer hardness such as from about 50 to about 70. Other suitable polymers include various thermoplastic olefins such as copolymers made from ethylene and propylene monomers having a high content of ethylene repeating units therein, polyethylene, and the like; various elastomers such as styrene-butadiene-styrene block copolymers, various styrene-butadiene rubbers, neoprene, various blends of polypropylene and EPDM (ethylene-propylene-diene-monomer) rubber, and the like.

An exterior seal 50 is secured to the outside extension 36b of the U-shape side channel 36 where the exterior seal 50 comprises a base member 52 with a recess secured to extension 36b and a resilient stem member 54 extending away from the base member 52 and curved slightly toward the glass pane 34. The stem member 54 terminates with a tapered distal end which is inwardly curved and resiliently and slidably engages and seals against the glass pane 34. Desirably, exterior seal 50 is coextruded and contains low friction inner portion 51A and a flexible outer portion 51B. The exterior seal 50 further contains a C-shape resilient, low friction channel 56 which acts as a glass run channel and is located between inside extension 36a and outside extension 36b of the side channel 36. The outer portion 51B and channel 56 preferably is a material of a tough but slippery weather resistant thermoplastic such as polypropylene, polyvinyl chloride, and ionomer resins such as surlyn, and various thermoplastic olefins such as various physical blends of polyethylene and polypropylene, and the like, whereas inner portion 51A is a flexible member such as a thermoplastic elastomer, for example various blends of polypropylene and EPDM, and the like. Glass run channel 56 generally extends the vertical length of each side U-channels 36 and is adapted to surround the peripheral front and rear edge of the glass pane 34 as well as provide a lateral stabilizing guide as the glass is raised and lowered. Both side U-channels 36 generally contain the same combination of sealing elements.

Figure 3:
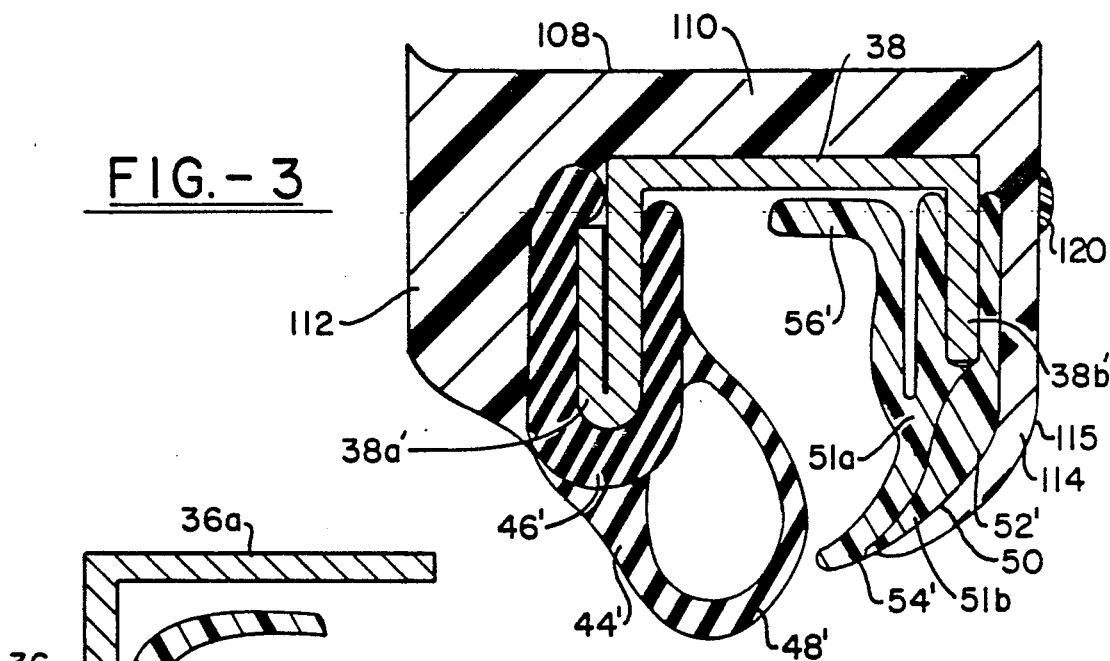
FIG. 3 is a sectional view taken along line 3—3 in FIG. 2.

The inverted U-shape, top channel portion, as shown in FIG. 3, has sealing members which are essentially identical to the side channel sealing members with said description thereof being hereby fully incorporated by reference and preferably is a continuous extension thereof. Thus, top U-channel portion 38 contains an inverted inside extension 38a' and outside extension 38b' extending downwardly and defining the inverted U-shape construction. Similarly, interior seal 44' is secured to inside vertical extension 38a' and comprises a solid, generally rigid member 46' having a recess slot which securely engages extension 38a' and a flexible hollow extension member 48' which is adapted to engage and seal against the inside of glass pane 34. Exterior seal 50' comprises a base member 52' with a recess secured to vertical extension 38b' and a resilient stem member 54' which resiliently and slidably engages the outside of glass pane 34. Seat 56 which is an integral part of exterior seal 50' resides within the uppermost portion of U-channel 38 and is contacted by glass pane 34 upon full closure thereof. The portions of the seal depicted in FIG. 3 engage the upper horizontal portion of the glass pane only when it is in a closed position and secures a tight weather-proof seal.

As noted, the lower end of the glass opening is formed by the lateral channel guide means comprising the transversely spaced inside Z-member 40 and outside I-member 42 which are welded or otherwise secured laterally between and to the vertical side U-channels 36, 36. The inside Z-member 40 contains an inside upright extension 40a fitted with an interior belt line seal 60 containing rigid base member 62 secured to extension 40a and an outwardly directed flexible hollow bulb 64, which are essentially of the same construction as described for the interior seal 44 secured to the side U-channels 36. The outside I-member 42 contains an upwardly extending structure terminating in an inverted J-structure 66 adapted to overlap the adjacent edge of the door panel 28. The inverted J-structure 66 is fitted with a resilient exterior belt line seal 70 comprising a base member 72 secured to the inverted J-structure 66 and an upwardly directed tapered stem 74 curved slightly inwardly toward the glass pane 34 and adapted to engage and seal the outside surface of the glass pane 34. The exterior belt line seal 70 contains an inner portion 71A and an outer portion 71B. The belt line seal 70, which is essentially of the same construction as exterior seal 50 with said description thereof being hereby fully incorporated by references, is secured to the vertical U-channels 36. Thus, the interior belt line seal 60 and the exterior belt line seal 70 cooperate to engage and seal the interior and exterior surfaces respectively of the glass pane 34 passing between the lateral channel guide means defined by the Z-member 40 and I-member 42 and effect a good weather seal therewith. Moreover, the belt line exterior seal 70 can have a cosmetic covering (not shown) thereon such as a suitable plastic, for example, polyurethane, and can be color coordinated with the vehicle.

Referring now to the glass regulator assembly 24 for raising and lowering the glass pane 34 within the automobile door, as best seen in FIG. 1 the regulator assembly 24 comprises the glass pane 34, a back mounting plate 76 which may be integral with U-shape channels 36, an X-pulley cable system operative to raise and lower the glass pane 34, and an actuating means for operating the cable system. The cable system as shown in FIG. 7 comprises a continuous cable or belt having internal criss-cross members 78,78 and laterally spaced vertical run members 80,80 engaging a pair of similarly spaced upper pulley wheels 82 and lower pulley wheels 84 where the vertical cable members 80,80 simultaneously advance upwardly or retract downwardly. At the lower periphery of glass pane 34, a pair of laterally spaced grommets 86,86 are adapted to be secured to the generally vertically orientated cable members 80,80 by a fastening means 88,88 secured to the vertical members 80,80. Optionally, a lateral stabilizing bar 90 is secured between the fastening means 88,88 to maintain the lateral distance between the vertical members 80,80 in addition to equalizing strain and supporting the glass pane 34. Lateral stabilizing bar 90 is approximately horizontal but can be skewed somewhat to accommodate the specific glass pane 34 configuration. The upper pulley wheels 82,82 and the lower pulley wheels 84,84 are operatively secured to the back mounting plate 76 by way of matching holes 92,92 and 94,94, respectively, located near the four corners of the mounting plate 76 and secured by bolt means or the like. At the center of the X-cable system where the internal members 78,78 criss-cross, a cam means 96 is attached to the end points of criss-cross members 78,78 to provide the coordinated simultaneous upward or downward movement of the vertical members 80,80.

Cam means 96 is attached to a window glass crank, not shown, or optionally to drive shaft 100 of an electric motor 98. The motor 98 is secured to the backside of the mounting plate 76 by bolts secured through a plurality of bolt holes surrounding a central opening 102 adapted to permit the drive shaft 100 to pass through and be secured to the cam means 96 on the front side of the mounting plate 76.

Upon rotation of the drive shaft 100, the glass pane 34 moves upwardly or downwardly in conjunction with the vertical members 80,80. In order to prevent the glass pane 34 from freely dropping while lowering the glass pane 34, a ratchet type spring mechanism 104 is mounted on the upper part of the back mounting plate 76. The ratchet spring mechanism 104 permits the glass pane 34 to be raised unimpeded but tension in the spring is activated upon the glass pane 34 being lowered to prevent the same from falling freely. In the operation of the X-cable system, the laterally spaced vertical members 80,80 follow the path of the glass pane 34. If the vertical glass run channels are not straight but curved, the vertical members 80,80 will not maintain a straight vertical line but instead will following the curvature of the glass run channel 36. Hence, additional cable length is required upon raising and lowering the glass pane 34 and this is provided by a tension spring means 106 located within the cable system.

In accordance with the present invention, the glass regulator assembly can be preassembled and then attached to the frame and seal assembly 22 by welding or otherwise securing the back mounting plate 76 to the laterally spaced side U-channels 36,36 at the lower section of the frame and seal assembly 22. The back mounting plate 76 remains stationary relative to the frame and seal assembly 22 while the glass pane 34 is operative to be raised or lowered within the vertical side U-channels 36,36 of the frame and seal assembly 22. Thus, the frame and seal assembly 22 and glass regulator assembly 24 are secured together to provide an integral unitary cassette construction comprising the automobile door glass cassette 20 of the present invention.

In accordance with the present invention, the assembled door glass cassette 20 comprising the frame and seal assembly 22 and the glass regulator assembly 24 operatively secured together is encapsulated with a peripheral gasket of resilient elastomeric material to provide a continuous gasket 108 on the outside perimeter of the frame assembly 22. When on the exterior of the frame assembly, the gasket 108 provides a cosmetic covering. The elastomeric gasket 108 is particularly adapted to facilitate an easy snap-in procedure on an assembly line for installing the door glass cassette 20 within an automobile door structure 26. The peripheral elastomeric gasket 108 further provides tight alignment within the door structure 26, a crack-free integral seal, as well as noise reduction of the wind passing thereover.

The structure of the elastomeric gasket means is best seen in FIG. 6 with respect to the vertical side U-channels 36,36 and in FIG. 3 with respect to the top channel 38. FIG. 6 is a cross-sectional view showing a horizontal cross-section view of the frame and seal assembly 22. In FIG. 6, the gasket 108 integrally comprises an enlarged base section 110 secured to the backside or base part of U-channel 36, an internal section 112 encasing most of the otherwise exposed exterior surface of the rigid member 46 of the interior seal 44, and a narrowed exterior section 114 encasing most of the distal end 54 of the base member 52 of the external seal 50. In a similar manner, FIG. 3 illustrates a vertical cross-section of the top U-channel 38. The gasket 108 similarly comprises an integral construction having the base section 110 secured to the backside of the base of the inverted top U-channel 38, an internal section 112 and a narrowed external section 114. Thus, the gasket means 108 substantially encapsulates the side U-channels 36,36 and the top U-channel 38 in such a manner as to provide an integral frame and seal assembly 22 which is especially useful in assembling the door glass cassette 20 within the automobile door structure 26. The base 110 and internal 112 sections provide a right angle gasket of the necessary elastomeric thickness to facilitate sliding insertion into the door structure 26 and provide a compressive engagement therewith. If desired, a plastic trim strip comprising a mold strip 120, as shown in FIGS. 3 and 5, can be added to stem member 54 of the exterior seal 50 for purposes of styling. Gasket material 108 can be a semi-rigid, resilient elastomeric material such as generally a thermoset polyurethane. Such materials are well known to the art and to the literature. The peripheral elastomeric gasket 108 is applied to the upper perimeter of the frame structure 22 but typically not below the belt line Z-member and I-member unless desired. The upper portion of the window frame and seal assembly 22 as from the belt line to top channel 38 can be placed in a perimeter mold having an interior cavity to accommodate the desired structure of the gasket 108 to be formed. Liquid polyurethane can be injected into the perimeter mold to encapsulate the backside of the respective U-channels 36,36,38 as well as partially encapsulate portions of the interior seals 44,44,60 and exterior seals 50,50,70 as previously described. The liquid polyurethane is then cured under heat to produce a resilient solid thermoset polyurethane gasket 108. Generally, gasket 108 is formed by reaction injection molding compounds (i.e., RIM) such as various polyesters, various polysulfides, various nylons, and the like. Such polymers are known to the art as well as to the literature. The belt line channel means formed by the transversely spaced Z-member and I-member are also generally encased with elastomeric material. The resulting elastomeric encapsulated and integral automobile door glass cassette 20 is easily and quickly slipped or installed into an automobile door structure 26 during assembly.

An important aspect of the present invention is that the offset from the exterior surface 115 of exterior gasket section 114 to the exterior surface of the window pane 34 is generally very small and can be on the order of from about 3 millimeters to about 6 millimeters and in the present embodiment is approximately 4 millimeters. Such small offset distances are provided by the integral frame and seal assembly 22 which permits the window pane 34 to reside in glass run channel 56 in close proximity to exterior seal 52. The small offset exists not only with regard to the exterior belt line seal 70, but also with regard to exterior seal 50 which exists in the header portion of the window as well as the generally vertical side channels and thus provides an entire frame and seal assembly 22 which has very low wind resistance from an aerodynamic standpoint in association with glass pane 34. An aesthetic, clean-finish window is thus provided which is also very desirous from a styling standpoint.

In an embodiment shown in FIGS. 1 and 2, the encapsulated frame and seal structure 22 can further include side panels on either side of the glass opening. The left or rearward panel in the drawings is shown as an elongated vertical panel 116 while the right or forward panel comprises a triangular mirror panel 118. Both panels 116, 118 comprise a polymer base such as polyurethane connected to the respective U-channel 36, whereupon both the vertical panel 116 and the mirror panel 118 can be encapsulated with elastomeric material within appropriate die cavities provided in connection with the perimeter mold for curing the elastomeric material.

The cassette-like structure 20 of the present invention can be simply slipped into an existing car door structure 26 and attached thereto by snapping the top portion, as well as the side portions, of the encapsulated frame and seal structure 22 into place and securing the various portion with plastic rivets or the like having unidirectional flanges thereon. Alternatively, adhesives or liquid seals can be utilized.

Although the present invention has been described in respect to a door glass cassette for an automobile door, it is readily seen that the unit can be adapted to be used in any type of vehicle containing a window.

While in accordance with the Patent Statutes, the best mode and preferred embodiment has been set forth, the scope of the invention is not limited thereto, but rather by the scope of the attached claims.

What is claimed is:

1. A door glass cassette adapted to be fitted within and secured to a vehicular door structure to provide a raisable and lowerable glass window, said door glass cassette, comprising;
    a frame and seal assembly comprising two laterally spaced side channels adapted to provide vertical runs for raising and lowering the glass pane, a top channel extending between the side channels at the top of each said side channel, and lateral guide means comprising transversely spaced lateral guides secured between said side channals, said lateral guide means being a Z-shape inside channel and a short vertical height I-shape outside channel, said channels and guide means collectively defining a glass opening in said door glass cassette, each said channel and said guide means having secured thereto an interior seal and an exterior seal adapted to cooperatively engage said glass pane adjacent to said glass opening.

2. A door glass cassette according to claim 1, including means for raising and lowering said door glass, and means for connecting said raising and lowering means with said door glass.

3. A door glass cassette according to claim 1, wherein said side channels are U-shape channels having said open U-shape structure facing toward the glass opening, and wherein the top channel is an inverted U-channel having said open U-shape structure facing downward.

4. A door glass cassette according to claim 3, wherein said U-shape structures of said side channels and said top channel comprises an inside extension, an intermediate base, and an outside extension, wherein said interior seal is secured to said inside extension and wherein said exterior seal is secured to said outside extension of said channel.

5. A door glass cassette according to claim 4, wherein said exterior seal comprises a base section secured to said inside extension of said U-channel, wherein said base section of said exterior seal extends outwardly from said inside extension into a tapered stem member orientated toward and adapted to seal the outside surface of the glass pane.

6. A door glass cassette according to claim 4, wherein said interior seal comprises a solid member secured to said inside extension and a flexible member secured to said solid member, wherein said flexible member comprises a hollow bulb-like structure, said rigid member having a higher durometer than said flexible member, and wherein said flexible member is orientated toward and adapted to engage the inside surface of the glass pane in the raised position.

7. A door glass cassette according to claim 6, wherein said rigid member has a durometer hardness of from about 80 to about 90 and wherein said flexible member has a durometer hardness of from about 50 to about 70.

8. A door glass cassette according to claim 4, wherein said inside Z-channel has an upwardly directed extension, wherein said interior seal is secured to said Z-channel upward extension, and wherein said transversely spaced I-channel has said exterior seal secured thereto.

9. A door glass cassette according to claim 8, including means for reaising and lowering said door glass, and means for connecting said raising and lowering means with said door glass.

10. A door glass cassette according to claim 8, wherein said exterior seal secured to said I-channel comprises a base section secured to the upper end of said I-channel, wherein said base section extends upwardly from said base section into a tapered stem member orientated toward and adapted to seal the outside surface of the glass pane.

11. A door glass cassette according to claim 10, wherein said interior seal secured to said upward extension of said Z-channel comprises a solid member secured to said upward extension and a flexible member secured to said solid member orientated toward and adapted to engage the inside surface of the glass pane, said rigid member having a higher durometer than said flexible member.

12. A door glass cassette according to claim 11, wherein said flexible member comprises a hollow bulb-like structure.

13. A door glass cassette according to claim 11, including means for raising and lowering said door glass, and means for connecting said raising and lowering means with said door glass.

14. A door glass cassette adapted to be fitted within and secured to a vehicular door structure to provide a raisable and lowerable glass window, said door glass cassette, comprising:

a frame and seal assembly comprising two laterally spaced side channels adapted to provide vertical runs for raising and lowering the glass pane, a top channel extending between the side channels at the top of each said side channel, and lateral guide means comprising transversely spaced lateral guides secured between said side channels, said channels and guide means collectively defining a glass opening in said door glass cassette, each said channel and said guide means having secured thereto an interior seal and an exterior seal adapted to cooperatively engage said glass pane adjacent to said glass opening, said channels being U-shaped channels having said open U-shaped structure facing toward the glass opening, the top channel being an inverted U-channel and having said open U-shape structure facing downward, said U-shape structures of said side channels and said top channel comprising an inside extension, an intermediate base, and an outside extension, said interior seal being secured to said inside extension and said exterior seal being secured to said outside extension of said channel, and wherein said exterior seal contains a C-shape glass run channel located between said inside extension and said outside extension and within said U-shape side channel.

15. A door glass cassette according to claim 14, including means for raising and lowering said door glass, and means for connecting said raising and lowering means with said door glass.

16. A door glass cassette adapted to be fitted within and secured to a vehicular door structure to provide a raisable and lowerable glass window, said door glass cassette, comprising:

a frame and seal assembly comprising two laterally spaced side channels adapted to provide vertical runs for raising and lowering the glass pane, a top channel extending between the side channels at the top of each said side channel, and lateral guide means comprising transversely spaced lateral guides secured between said side channels, said channels and guide means collectively defining a glass opening in said door glass cassette, each said channel and said guide means having secured thereto an interior seal and an exterior seal adapted to cooperatively engage said glass pane adjacent to said glass opening, said side channels being U-shape channels having said open U-shape structure facing toward the glass opening, said top channel being an inverted U-channel and having said open U-shape struture facing downward, said U-shape structures of said side channels and said top channels comprising an inside extension, an intermediate base, and an outside extension, said interior seal being secured to said inside extension and said exterior seal being secured to said outside extension of said channel, and said frame and seal assembly including an external perimeter surface defined by said side U-channels and said top channel, and said external perimeter surface being encased by an elastomeric material to provide a peripheral gasket.

17. A door glass cassette according to claim 16, including means for raising and lowering said door glass, and means for connecting said raising and lowering means with said door glass.

18. A door glass cassette according to claim 16, wherein said peripheral gasket is secured to said external perimeter surface of the upper section of said frame and seal assembly, and wherein said upper section of the frame structure is approximately above said lateral guide.

19. A door glass cassette according to claim 18, wherein said interior seal is secured to said inside extension and said exterior seal is secured to said outside extension, and wherein at least a portion of said interior seal and said exterior seal are encased within said elastomeric gasket.

20. A door glass cassette according to claim 19, wherein said elastomeric gasket comprises an enlarged base section secured to the intermediate base of said U-channel.

21. A door glass cassette according to claim 19, wherein said elastomeric gasket comprises an enlarged base section secured to said intermediate base of said U-channel, an enlarged inside section secured to said inside extension of said U-channel and covering portions of said interior seal secured to said U-channel, and a narrow outside section secured to said outside extension of said U-channel and covering only a distal end of said exterior seal secured to said outside extension.

22. A door glass cassette according to claim 21, wherein said elastomeric material comprising said peripheral gasket is polyurethane elastomer.

23. A door glass cassette according to claim 22, including means for raising and lowering said door glass, and means for connecting raising and lowering means with said door glass.

24. A door glass cassette adapted to matingly engage a vehicle door structure, comprising:

an integral frame and seal assembly, said frame assembly having a perimeter channel, said perimeter channel comprising two side channels and a top channel therebetween, said perimeter channel having an inside extension and an outside extension, said seal assembly comprising an interior seal mounted on said perimeter channel inside extension and an exterior seal mounted on said perimeter channel outside extension, said interior seal and said exterior seal being secured to said frame and seal assembly adjacent to the glass opening and being capable of engaging said glass pane and effecting a weather seal.

25. A door glass cassette according to claim 24, including means for raising and lowering said door glass, and means for connecting said raising and lowering means with said door glass.

26. A door glass cassette according to claim 24, wherein said seal assembly has a glass run channel seal, said glass run channel seal located between said exterior seal and said interior seal.

27. A door glass cassette according to claim 26, including a lateral channel guide providing an opening through which a glass pane can be raised and lowered, said lateral channel guide extending between said two side channels and secured thereto, said channel guide and said perimeter channel defining a glass opening.

28. A door glass cassette adapted to matingly engage a vehicle door structure, comprising:

an integral frame and seal assembly, said frame assembly having perimeter channel, said perimeter channel comprising two side channels and a top channel therebetween, said seal assembly comprising an interior seal mounted on said perimeter channel and an exterior seal mounted on said perimeter channel, said internal seal and said exterior seal being capable of engaging a glass pane and effecting a weather seal, a gasket, said gasket existing on the base of said perimeter channel and partially encapsulated said exterior seal and said interior seal and forming said integral frame and seal assembly.

29. A door glass cassette according to claim 28, including means for raising and lowering said door glass, and means for connecting said raising and lowering means with said door glass.

30. A door glass cassette according to claim 28, wherein said glass run channel is integral with said exterior seal.

31. A door glass cassette according to claim 30, wherein said interior seal comprises a rigid base member secured to said perimeter channel and a flexible hollow portion capable of matingly engaging the glass pane.

32. A door glass cassette according to claim 31, including means for raising and lowering said door glass, and means for connecting said raising and lowering means with said door glass.

33. A door glass cassette according to claim 31, wherein the interior portion of said exterior seal is made of polypropylene.

34. A door glass cassette according to claim 33, wherein said gasket material is made from a thermoplastic polyurethane.

35. A door glass cassette according to claim 33, wherein said perimeter channel is a U-shape channel, wherein said interior seal engages one leg of said U-shape channel, and wherein said exterior seal engages the remaining leg of said U-shape channel.

36. A door glass cassette according to claim 31, wherein said interior seal is made from a dual durometer EPDM.

37. A door glass cassette according to claim 36, including means for raising and lowering said door glass, and means for connecting said raising and lowering means with said door glass.

38. A door glass cassette adapted to be fitted in a vehicular door structure, comprising:

a door glass;

a frame and seal assembly for said door glass, comprising:

two laterally-spaced side channels adapted to provide vertical runs for said door glass, a top channel extending between the tops of said side channels, transversely-spaced lateral guide means between and secured to said side channels, each of said side channels and said top channel having an inside extension and an outside extension, said interior seal secured to said inside extension and said exterior seal secured to said outside extension, said seals being adapted to operatively engage said door glass, said side channels, top channel and lateral guide means collectively defining a door glass opening;

means for raising and lowering said door glass; and means connecting said raising and lowering means with said door glass.

* * * * *

UNITED STATES PATENT AND TRADEMARK OFFICE
CERTIFICATE OF CORRECTION

PATENT NO. : 5,001,867

DATED : March 26, 1991

INVENTOR(S) : Ronald E. Dupuy

It is certified that error appears in the above-identified patent and that said Letters Patent is hereby corrected as shown below:

Column 8, line 3, claim 5, delete "inside" and insert therefor --outside--.

line 5, claim 5, delete "inside" and insert therefor --outside--.

Signed and Sealed this

Sixteenth Day of November, 1993

*Attest:*

BRUCE LEHMAN

*Attesting Officer*   *Commissioner of Patents and Trademarks*